Patented Mar. 19, 1940

2,193,996

UNITED STATES PATENT OFFICE 2,193,996

DYE INTERMEDIATE

Frithjof Zwilgmeyer, Arden, Del., assignor to E. I. du Pont de Nemours & Company, Wilmington, Del., a corporation of Delaware No Drawing. Application June 23, 1937, Serial No. 149,888

8 Claims. (Cl. 260—198)

This invention relates to azo compounds, and especially to azo compounds having an amino group which is diazotizable and when diazotized is capable of being coupled to an azo dye coupling component. More particularly the invention relates to azo arylamines and to processes of making such arylamines which may be represented generally by the following formula

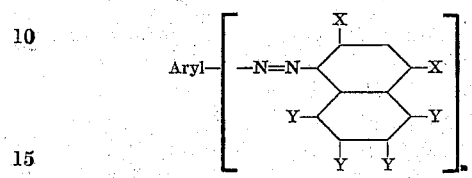

in which Aryl is an aromatic nucleus of a compound from the group consisting of benzene, naphthalene, carbazole, anthracene, diphenyl and azo-benzene compounds, one X is hydroxy and the other is hydrogen, one Y is amino and the other Y's are hydrogen, and $n$ is an integer 1 or 2, depending upon whether the Aryl-azo group is derived from an aryl amine or a diamine. In these compounds Aryl may be substituted by groups other than solubilizing groups, that is Aryl may be unsubstituted or it may be substituted generally by groups which do not lend solubility to the compounds.

It is among the objects of the invention to provide new azo compounds which are devoid of solubilizing groups and capable of being diazotized and coupled to azo dye coupling components. Another object of the invention is to provide processes for making the compounds. Another object of the invention is to provide intermediates for azo dyes which have good fastness properties. Other objects of the invention will be apparent from the following description.

The objects of this invention are attained generally by diazotizing or tetrazotizing arylamines of the benzene, naphthalene, carbazole, anthracene, diphenyl or azo-benzene series which are free from solubilizing groups, then coupling the diazo or the tetrazo salts, as the case may be, in alkaline reaction media with amino-naphthols which are represented by the formula

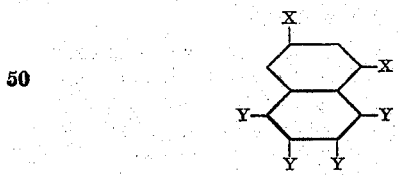

in which formula one X is hydroxy and the other X's hydrogen, and one Y is amino and the other Y's are hydrogen. By coupling under alkaline conditions, we have found that nearly all the coupling takes place in the ring bearing the hydroxyl group. It has also been found that the products may be purified from small quantities of the compounds formed by coupling in the ring bearing the amino group.

This invention will be more fully explained by reference to the following illustrative examples in which all quantities are stated in parts by weight, but the invention is not limited to the examples.

Example 1

15 parts of meta xylidine were diazotized and coupled to 16 parts of 1-amino-7-naphthol in alkaline solution by the method well known in the art. The precipitate was filtered, washed with water until it was free of alkali and then dried.

The product consisted of 29 parts of a dark brown powder which is represented by the following formula:

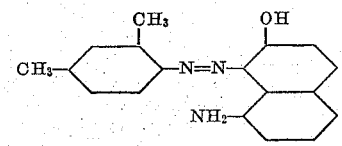

The product was diazotized and the diazo salts which were precipitated and separated from the reaction mixture and dried were found to be stable. A sample of cotton goods was impregnated with a diazo dye coupling component and the diazo salt was applied to the impregnated goods in the form of a printing paste. Brown shades were produced and the prints had good fastness to washing, light and the usual exposures to which dyed textiles are exposed. The diazo salts were fairly soluble in water and were found to be especially useful for making diazo salt solutions to be applied to goods which had been previously impregnated with diazo dye coupling components.

Example 2

15 parts of cresidine were diazotized and coupled to 16 parts of 1-amino-7-napthol in alkaline solution. The precipitate was filtered, washed free of alkaline and dried. The product was a dark brown powder which is represented by the following formula:

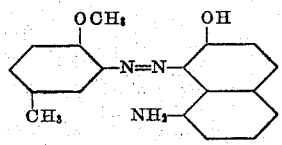

This product had in general the properties and utility of the product produced in accordance with Example 1.

Example 3

15 parts of para toluidine were used instead of meta xylidine and the procedure of Example 1 was repeated.

28 parts of a dark brown powder represented by the following formula were obtained:

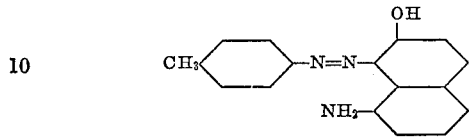

This product had in general the properties and utility of the product produced in accordance with Example 1.

Example 4

The procedure of Example 1 was repeated except that 15 parts of aniline were used instead of meta xylidine. The product is represented by the following formula:

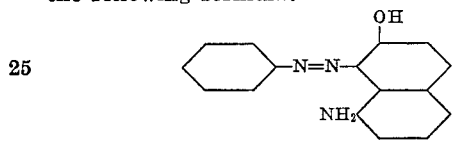

The properties of this product were similar to the product of Example 1 except the solubility of the diazo salts. The diazo salts were more soluble than the salts of Example 1.

Example 5

14 parts of para-chloro-ortho-toluidine were diazotized and coupled to 16 parts of 1-amino-7-naphthol in alkaline solution by methods well known to the art. The precipitate was filtered, washed free of alkali with water, and dried.

28 parts of a dark brown powder which is represented by the following formula were obtained.

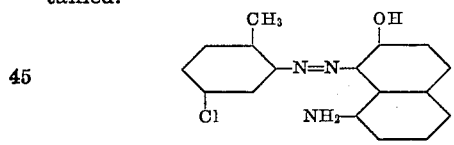

The properties and utility of the product are similar to the product of Example 1.

Example 6

32 parts of 2:5-dichloro-aniline were diazotized in the usual manner, then coupled to 32 parts of 1-amino-7-naphthol in alkaline solution. The precipitate was filtered, washed free of alkali with water and dried. 61 parts of a dark brown powder were obtained. The compound is represented by the following formula:

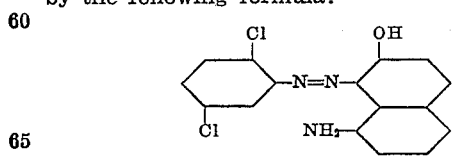

The properties and utility of the product are similar to the product of Example 1.

Example 7

15 parts of diazotized para-chlor-ortho-anisidine were coupled to 16 parts of 1-amino-7-naphthol in alkaline solution. The precipitate was filtered, washed free of alkali with water and dried. 29 parts of a dark brown powder were obtained. The compound is represented by the following formula:

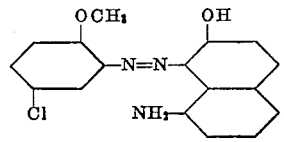

The properties and utility of the product are similar to the product of Example 1.

Example 8

17 parts of diazotized 2-nitro-4-chlor-aniline were coupled to 16 parts of 1-amino-7-naphthol in alkaline solution. The precipitate was filtered, washed free of alkali with water and dried.

32 parts of a dark brown powder represented by the following formula were obtained:

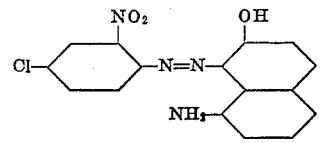

The properties and utility of the product are similar to the product of Example 1.

Example 9

20 parts of alpha-amino-anthraquinone were diazotized, then coupled to 16 parts of 1-amino-7-naphthol in alkaline solution. The precipitate was filtered, washed free of alkali with water and dried. 36 parts of a dark brown powder represented by the following formula were obtained:

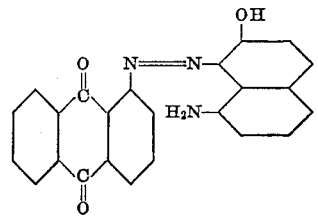

The properties and utility of the product are similar to the product of Example 1.

Example 10

20 parts of beta-amino-anthraquinone were diazotized, then coupled to 16 parts of 1-amino-7-naphthol in alkaline solution. The precipitate was filtered, washed free of alkali with water and dried. 35 parts of a dark brown powder represented by the following formula were obtained:

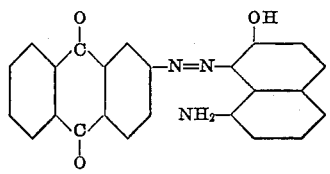

The properties and utility of the product are similar to the product of Example 1.

Example 11

21 parts of toluidine were tetrazotized, then coupled to 34 parts of 1-amino-7-naphthol in alkaline solution. The precipitate was filtered, washed free of alkali with water and dried. 50 parts of a dark brown powder represented by the following formula were obtained:

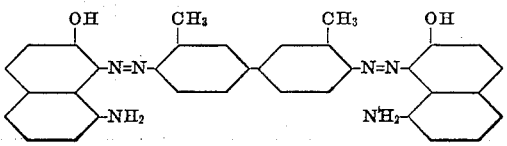

Example 12

18 parts of 3-amino-carbazole were diazotized, then coupled to 16 parts of 1-amino-7-naphthol in alkaline solution. The precipitate obtained was filtered, washed free of alkali with water and dried.

33 parts of a dark brown powder represented by the following formula were obtained:

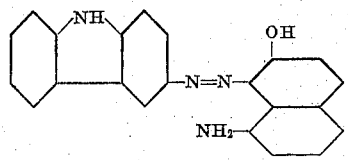

The properties and utility of the product are similar to the product of Example 1.

Example 13

24 parts of 4-amino-4'-dimethyl-amino-azobenzene were diazotized, then coupled to 16 parts of 1-amino-7-naphthol in alkaline solution. The precipitate was filtered, washed free of alkali with water and dried.

39 parts of a dark brown powder represented by the following formula were obtained:

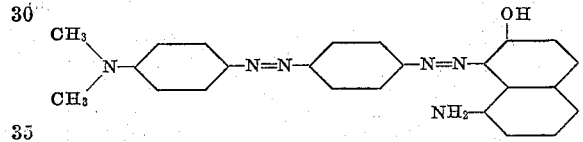

The properties and utility of the product are similar to the product of Example 1.

Example 14

32 parts of 2:5-dichloro-aniline were diazotized, then coupled to 32 parts of 1-amino-5-naphthol in alkaline solution. The precipitate was filtered, washed free of alkali with water and dried.

60 parts of a dark brown powder represented by the following formula were obtained:

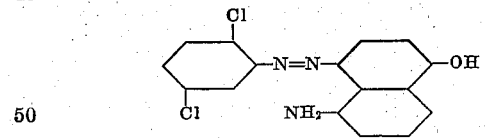

The properties and utility of the product are similar to the product of Example 1.

Example 15

15 parts of para-chlor-ortho-anisidine were diazotized, then coupled to 16 parts of 1-amino-5-naphthol in alkaline solution. The precipitate was filtered, washed free of alkali with water and dried.

33 parts of a dark brown powder represented by the following formula were obtained:

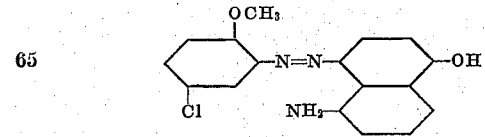

The properties and utility of the product are similar to the product of Example 1.

The azo arylamines of the invention are capable of being diazotized and coupled to azo dye coupling components forming insoluble dyes by employing the known ice color processes in which the diazotized azo arylamines are used instead of the diazo components ordinarily used. In these processes the compounds of the invention were applied as solutions to materials which had been previously impregnated with azo dye coupling components. Alternatively they were converted to water soluble diazoimino derivatives or to antidiazotates by methods well known in the art. These compounds were then mixed with coupling components, the goods were printed or impregnated therewith and the dyes were developed by treatment with weak acids. The diazotized salts of this invention can be separated directly from the diazo reaction mixtures and these salts can be used in solutions or in printing pastes to give good dyeings on fibres which had been previously impregnated with coupling components. The dyes were found to give good dyeings on textile fibres and fabrics, particularly cotton, regenerated cellulose and related materials and dyeings of good fastness to washing and the usual exposures to which such materials are subjected were made.

The foregoing examples illustrate only a few of the many new azo-arylamines obtainable according to the present invention. The arylamines which are free from the water solubilizing carboxyl and sulphonic acid groups, may be diazotized and coupled with aminonaphthols to produce the new azo-arylamines according to the present invention. The aryl nucleus of the diazo component may be a benzene or a naphthalene nucleus which is unsubstituted or is substituted by groups other than carboxy and sulphonic acid. In general from 1 to 3 substituent groups in this component are satisfactory but more can be used. The substituents from the groups alkyl, alkoxy, aryloxy, aralkyl, aralkoxy, aryl, hydro-aryloxy, acylamino, halogen, nitro and even others, except carboxy and sulphonic acid can be used. From the standpoint of solubility of the diazo salts of the compounds, those which contain 1 or 2 alkyl and alkoxy groups give excellent results.

Among suitable amines other than those illustrated in the above examples the following are mentioned:

Ortho-toluidine
Meta-toluidine
Ortho-anisidine
Para-anisidine
Para-phenetidine
Ortho-xylidine
Para-xylidine
2:5-dimethoxy aniline
2:5-diethoxy aniline
Ortho-chloro-aniline
p-Nitro-aniline
4-nitro-2-amino-anisole
4-chloro-2-amino-anisole
3-amino-benzo-trifluoride
Ortho-phenetidine
4-benzoyl-amino-2:5-diethoxy-aniline
Alpha-naphthylamine
1-amino-2-methoxy-naphthalene
Amino-azo-benzene
Benzidine
4:4'-diamino-diphenylamine
4:4'-diamino-diphenyl-ether
4:4'-diamino-azo-benzene All the amino-naphthols may be utilized generally as second components in the preparation of the new azo-arylamines. These amino-naphthols include 1:5-, 1:6-, 1:7-, 1:8-, 2:5-, 2:6-, 2:7- and 2:8-amino-naphthols.

The general methods of preparing the azo-arylamines of the invention as well as numerous variations in the details of these methods are understood in the art. However, the coupling of the diazotized arylamines or tetrazotized arylene-diamines must be carried out under alkaline conditions in order to obtain products consisting chiefly of the compounds in which coupling has taken place in the nucleus of the amino-naphthol bearing the hydroxyl substituent.

When the products contain compounds which result from coupling to the nucleus of the amino-naphthol bearing the amino substituent, the products may be purified to free them from these impurities by various methods. The most convenient method consists in stirring the crude products with a strong mineral acid under proper conditions of acidity, volume and temperature, the principles of which are generally understood by the art. The desired products are caused to dissolve in the acid while the by-products are insoluble. The solutions are filtered and the purified products recovered from the filtrate by precipitation with alkali, filtration, washing and drying. Alternatively the products may be purified by crystallization from a suitable organic solvent.

By the use of the new azo-arylamines as diazo components, a range of ice colors of good fastness properties are produced, the shades usually being browns or blacks.

Since from the foregoing description of the invention it will be apparent to those skilled in the art that many embodiments of the invention may be made without departing from the spirit and scope thereof, it is to be understood that the invention is not limited to the specific embodiments disclosed.

I claim:

1. A compound represented by the formula:

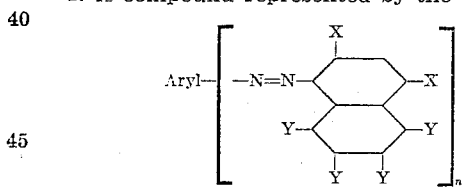

in which Aryl is a radical of the group consisting of radicals of the benzene, naphthalene, carbazole, anthracene, diphenyl and azo-benzene series which are devoid of carboxy and sulfonic acid groups; one X is hydroxy and the other is hydrogen; one Y is amino and the others are hydrogen; and $n$ is an integer not greater than 2, said compound being characterized by having only one hydroxy group, by being insoluble in water and by having at least one diazotizable primary amine group.

2. The compound represented by the formula:

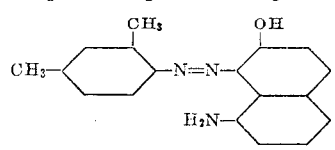

3. The compound represented by the formula:

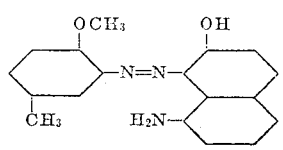

4. The compound represented by the formula:

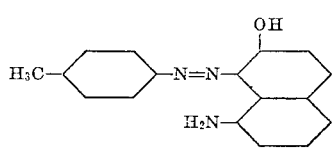

5. The process which comprises diazotizing an insoluble primary arylamine from the group consisting of mono-amines and diamines of the benzene, naphthalene, carbazole, anthracene, diphenyl and azo-benzene series which are devoid of hydroxy groups; and coupling in alkaline medium with an amino-naphthol from the group consisting of 1:5-, 1:6-, 1:7-, 1:8-, 2:5-, 2:6-, 2:7- and 2:8-amino naphthol.

6. The process which comprises diazotizing metaxylidine and coupling in alkaline medium with 1-amino-7-naphthol.

7. The process which comprises diazotizing cresidine and coupling in alkaline medium with 1-amino-7-naphthol.

8. The process which comprises diazotizing para toluidine and coupling in alkaline medium with 1-amino-7-naphthol.

FRITHJOF ZWILGMEYER.